United States Patent
Lullwitz et al.

(10) Patent No.: US 6,682,670 B2
(45) Date of Patent: Jan. 27, 2004

(54) METHOD OF PRODUCTION BLOW-MOLDED SYNTHETIC RESIN ARTICLES

(75) Inventors: Uwe Lullwitz, Cologne (DE); Antonius Schlutermann, Lohmar (DE); Dirk Wehrens, St.Augustin (DE)

(73) Assignee: SIG Blowtec GmbH & Co. KG, Bonn (DE)

( * ) Notice: Subject to any disclaimer, the term of this patent is extended or adjusted under 35 U.S.C. 154(b) by 391 days.

(21) Appl. No.: 09/900,523

(22) Filed: Jul. 6, 2001

(65) Prior Publication Data

US 2002/0014708 A1 Feb. 7, 2002

(30) Foreign Application Priority Data

Jul. 7, 2000 (DE) .......................................... 100 32 610

(51) Int. Cl.[7] .......................... G06F 19/00; B29C 47/92
(52) U.S. Cl. ..................... 264/40.3; 264/40.7; 264/540; 425/169; 700/204
(58) Field of Search ............................. 264/40.3, 40.7, 264/540; 425/169; 700/204

(56) References Cited

U.S. PATENT DOCUMENTS 5,399,302 A * 3/1995 Noguchi et al. ............ 264/412
6,284,169 B1 * 9/2001 Feuerherm et al. ........ 264/40.1
6,620,352 B1 * 9/2003 Davis et al. ................ 264/40.4

FOREIGN PATENT DOCUMENTS

DE            36 19 113           2/1987

OTHER PUBLICATIONS

"Wanddickenoptimierung Beim Blasformen Durch Mikrorechnereinsatz", P.B.Junk et al, Kunststoffe 74(1984) 1, 4 pages.

* cited by examiner

Primary Examiner—Suzanne E. McDowell
(74) Attorney, Agent, or Firm—Herbert Dubno

(57) ABSTRACT

A method of blow-molding synthetic resin articles in which an image of an actual article is produced by blow-molding is displayed. A wall thickness control curve on a display screen of a computer controlling the blow-molding machine and critical locations of the curve are graphically reproduced on the image of the article.

4 Claims, 2 Drawing Sheets

METHOD OF PRODUCTION BLOW-MOLDED SYNTHETIC RESIN ARTICLES

FIELD OF THE INVENTION

The present invention relates to a method of producing blow-molded synthetic resin articles utilizing a blow-molding machine which produces at least one preform with a wall varying along its length utilizing a nozzle head with a nozzle gap width controlled by a computer unit based upon comparison of actual values with stored values and under program control.

More particularly, this invention relates to a method of producing blow-molded articles in this manner with improved computer control of the products which are produced.

BACKGROUND OF THE INVENTION

A blow-molding machine for synthetic resins having a nozzle head through which the parison or preform is extruded and having its nozzle gap width controlled by a computer unit is described in DE 36 19 113 A1. This blow-molding machine for synthetic resins has a double-conical head for forming a cylindrical body which is extruded from a nozzle whose nozzle gap width is determined between the lower end of a mandrel and the inner lower end of a double-conical head by the vertical movement of the mandrel which adjusts or sets the gap.

The injection stroke of an injection piston is provided with a sensor connected to the setting unit which allows the setting of the thickness profile of the nozzle slit. The setting device is also associated with a setting value for a setting cylinder and a marking device with the aid of which markings can be applied to the extruded preform at certain distances in the longitudinal direction or direction of extrusion thereof. The adjusting system can further include a thickness-measuring unit which can determine the cross section or wall thickness of the shaped article, i.e. the finished article.

The determination of the wall thickness control curve and its use in adjusting the nozzle gap which is a programmed function of that wall thickness control curve utilizes the markings at predetermined spacings in the longitudinal direction for a comparison with the measured cross section or the measured wall thickness to ensure that the control unit will establish a predetermined thickness at each critical point in the length of the article which is produced by suitably controlling the thickness of the extruded parison at the region determined by the marking.

The nozzle gap is thus adjusted by control scanners from the control unit, namely the computer based upon a comparison with the actual gap width and the programmed gap width as determined at the marked point by the wall thickness control curve. As a consequence a length signal is obtained which is a function of the determined length of the preform and a piston position signal is obtained from the sensor while a cross section or wall thickness signal is obtained form the thickness-measuring device and these signals are so supplied to the control unit, namely, the computer that a constant wall thickness and the value of the thickness cross section as a function of the parison length is displayed visually on a display screen of the computer and is maintained automatically.

From the German Journal "Kunststoffe" (Synthetic Resins) 74 (1984) (1984), Volume 1, pages 9–11, wall thickness optimization in a blow molding is known utilizing microcomputer control based upon partial wall thickness control systems (PWDS). The microcomputer which is used has an integrated wall thickness program (firmware) which controls the wall thickness of the preform or parison in its length and peripheral directions in addition to control of the temperature of the extrusion cylinder and the temperature of the extruded mass utilizing a cascade control, and also controls the movements of the blowing mandrel and the transport and mold closure systems.

By storage of predetermined setpoint values in an external data storage or memory of the computer, apart from the points in the profile of the article, all other data which determine the wall thickness distribution over the length of the article are stored and can be called up for producing the particular article. The program in the computer can rely on such data. The markings on the parison or preform which result in the particular wall thickness profile and cross section can be displayed for the operator and designer on the display unit of the microcomputer.

OBJECTS OF THE INVENTION

It is the principal object of the present invention to improve the method of making blow-molded synthetic resin articles so as to simplify that method, improve the quality and reproducibility of the articles made and ensure greater precision in the actual molding of the articles based upon a wall thickness control curve.

Another object of the invention is to provide a method of making such articles whereby drawbacks of earlier systems are avoided.

SUMMARY OF THE INVENTION

These objects and others which will become apparent hereinafter are attained, in accordance with the invention, in a method of producing blow-molded articles from synthetic resin which comprises the steps of:

(a) blow molding an elongated hollow article with a wall thickness varying along a length thereof on a blow molding machine having a computer-controlled blow molding nozzle with a nozzle gap width varying during the blow molding of the article in accordance with a stored program and comparison of measured values of the gap width with programmed values thereof;

(b) displaying an image of an article blow molded in step (a) on a screen of a computer controlling the blow molding machine alongside an outline of a wall thickness control curve generated by the program and represented an intended wall thickness of blow molded articles to be produced; and (c) marking critical locations of the wall thickness control curve on the displayed image.

More particularly, the finished article, usually in the form of a photograph thereof, is scanned and an image of the finished article is displayed on a screen of the computer unit alongside the profile of the wall thickness control curve and critical locations of the curve profile are marked and graphically associated with the displayed image. This allows modification of the curve profile at the critical marked points by the control unit to accommodate deviations of the actually produced article from the desired shapes or profiles or wall thicknesses at these locations.

The operator can, without delay, recognize a deviation of the shape or wall thickness at the critical locations by a visual comparison on the screen and bring about immediate correction. The photograph may be a photograph obtained by conventional film photography and scanned utilizing a scanner, or a photograph procured by an electronic scanner and transferred electronically to the computer.

The viewer can immediately see when a critical location, marked on the screen in the manner described, does not correspond to the documented finished article so that some adjustment of the nozzle gap can be effected. The process can be repeated until the shape of the finished article and the wall thickness distribution thereof is at optimum.

The scanning in of photographs or otherwise providing the computer with true to nature images of different finished articles allows the programs for operating the blow-molding machine and introducing the finished articles to be tweaked or tuned to the actual products made so that it is no longer necessary to store large numbers of finished articles for documentation of the program or to provide wall thickness comparisons or setpoint values for the respective processes for producing the particular articles.

In the simplest case, the variable nozzle gap at the output side of the blowing head for the parison or preform is used for control. To avoid variations in the weight of the preform, the stroke of the mandrel is controlled based upon a factor which includes a basic component and a profile component in addition to a linear component, depending upon the length of the parison and the material used.

Furthermore, the profiles of the wall thickness curves of different finished articles and/or varied profile curves can be stored in the computer or in an associated memory and the operator can access an archiving system which allows program change by the selection of particular pages from the archive for display of the respective finished articles on the screen. In other words, not only is the data for producing a particular article stored, but the images of the finished articles associated with those programs are archived as well and can be called up as required.

As has been noted, deviations of the documented finished article actually produced from the wall thickness control curve can be readily determined and the control curve altered to ensure production of the desired finished article shape and wall thickness distribution. The different profiles of the wall thickness control curve, i.e. the original form and the modified forms associated with the archived finished articles and other curves which are to be imparted to various articles all can be stored and called up as required to modify the control curve or the process for producing a particular article. Each finished article produced by the machine as well as all of the data for producing can be archived together in a data base of the computer or separate but accessible memory.

BRIEF DESCRIPTION OF THE DRAWINGS

The above and other objects, features, and advantages will become more readily apparent from the following description, reference being made to the accompanying drawing in which.

SPECIFIC DESCRIPTION

Figure 1:
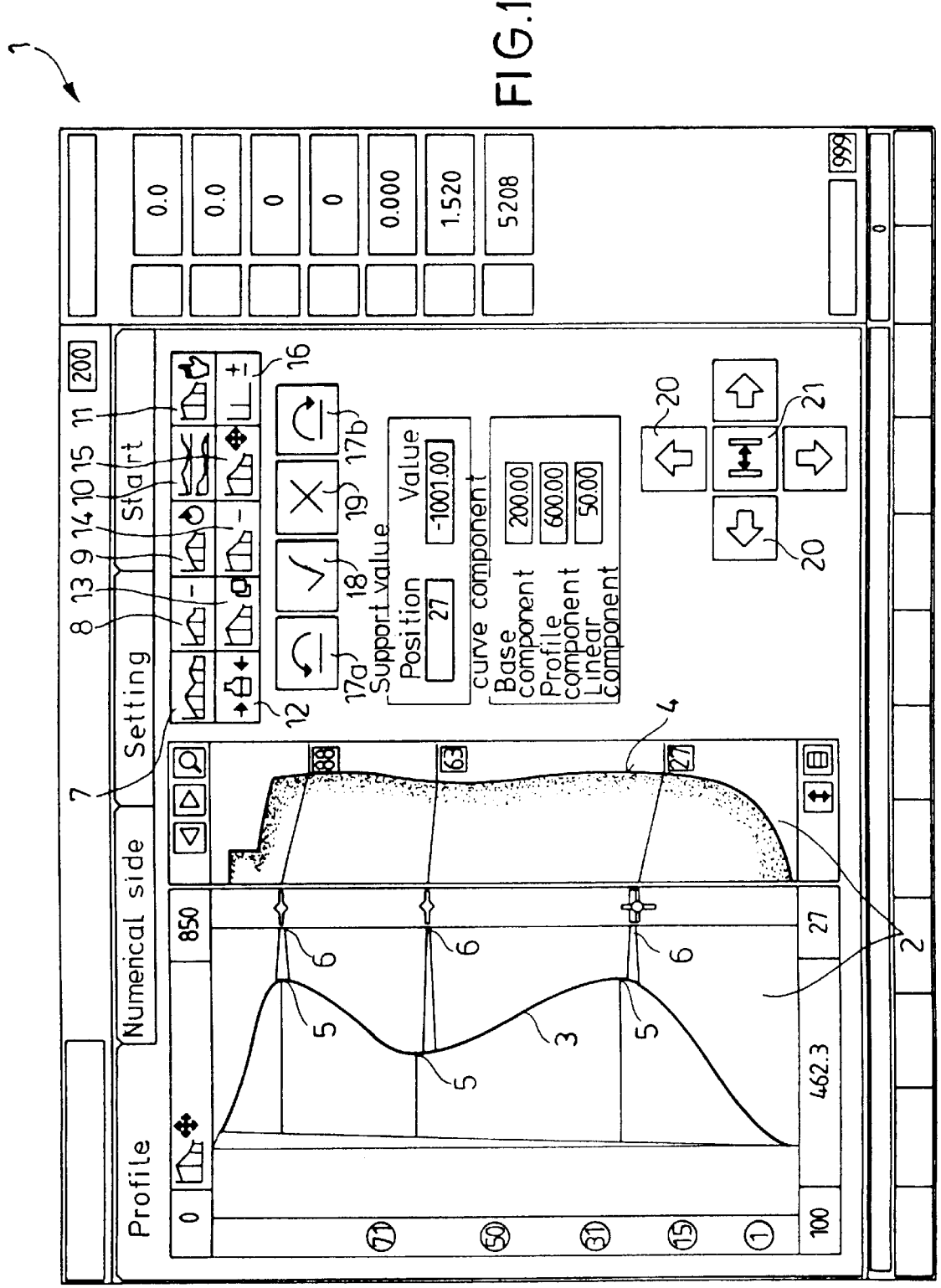
FIG. 1 is a diagrammatic elevational view of the display of a microcomputer in accordance with the invention.
Figure 2:
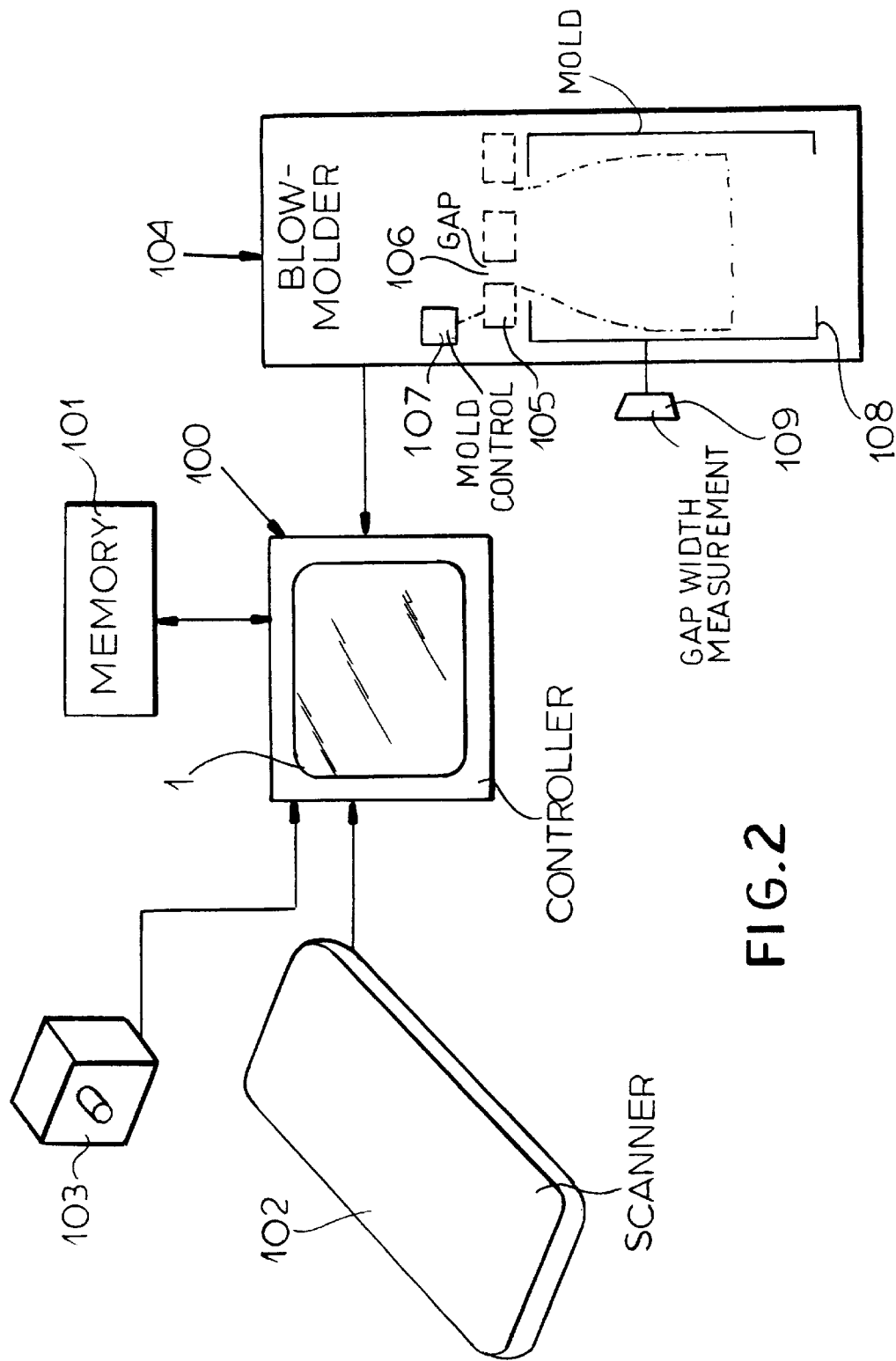
FIG. 2 is a diagram of the system of the invention.

In FIG. 2 a system utilizing the principles of the invention has been shown and comprises, in addition to the microcomputer 100, provided with the touch screen display 1 to be described in greater detail hereinafter, a memory 101 which can contain all the ar hives necessary for use by the computer and can store programs, images and the like as desired. An important aspect of the invention is that an input of the computer of the actual appearance of the finished article can be provided and that input can be by, for example, a scanner 102, capable of scanning film photographs of the article, a digital camera 103 or the like.

The blow-molding machine itself has been represented diagrammatically at 104 and includes, as has been diagrammatically indicated only, an extrusion mold 105 with a variable gap 106 and devices 107 for controlling the blow mold 108 and a device 109 providing a gap width measurement.

The details of the blow-molding machine have not been give, as has been noted and, for example, a blow-molding machine can have the construction of DE 36 19 113 A1.

The display and service screen or field 1 of the computer has also been illustrated somewhat diagrammatically and serves to display side-by-side the profile of the wall thickness control curve 3 and an image 4 of the scanned article. In addition to these images, the display 1 has fields serving for control and regulation and, in particular, for axial and radial wall thickness control (PWDS) which can regulate the vertical position of a mandrel of the blowing head of the blow molder 104 to thereby vary the nozzle gap width corresponding to the desired thickness distribution.

The operator, who may be a designer of the article or simply an individual skilled in the production of the articles by blow molding in order to optimize the wall thickness control, displays, for example, the image produced by a scanner from the photograph of the finished article at 4 adjacent the profile of the wall thickness control curve 3. At critical locations 5 of the extruded parison or preform, markings 6 are provided on the screen and graphically associated with the finished article 4 at the locations along the length of the article represented at points 27, 63 and 88. These are displayed as support value positions in an appropriate support value field of the display.

In the case of deviations from the documented setpoint values for the finished article 4 given by the program and stored data, any requisite modifications of the curve profile or the wall thickness control curve 3 are undertaken to optimize it. These changes can be made automatically or can be carried out by teaching the various fields on the screen to change the profile at the particular support value position. The optimum wall control curve and the various wall control curves for the different finished articles as optimized are stored and archived in memory so that the article programs and images can be called up as desired for producing the finished articles.

The display of service field 1 has numerous iconic symbols representing areas that can be attached to effect specific operations or monitoring procedures. For example, these iconic symbols located in respective fields include a quality monitoring mode symbol 7, a profile-erasing mode symbol 8, a profile-rotating mode symbol 9, a profile-synchronizing mode symbol 10, a selection mode symbol 11, a segment-coupling mode symbol, a segment-erasing mode symbol 14, a curve-control mode symbol 15, a support-point inputting or erasing mode symbol 16, a stepping button 17a, 17b, a profile-accepting mode symbol 18 and a profile-changing mode symbol 19. The mobility through the tables and on the images can be effected by operation of the cursor buttons 20 and actuation of the marking button 21 can apply the markings.

The operator can, by actuating the quality-monitoring mode 7, adopt the actual value curve as the master curve. To that, a tolerance point can be applied of adjustable width. If the subsequent actual values exceed or fall below the tolerance band, a signal, e.g. an acoustic signal is given. By actuation of the erase button 8, the entire profile can be erased while the button 9 allows the entire profile to be rotated so that, for example, support values which are at one profile end can be shifted to the other end. With the synchronization mode 10 selected profiles can be simultaneously shifted. With use of the selection mode 12, a particular curve region can be selected and worked into the profile.

The settings of markings on the parison at defined profile positions can be effected in the mode 12 and the markings can be localized and then graphically associated with the article alongside the profile. The copying mode 13 allows a curve segment marked for the selection mode to be duplicated and shifted go another location of the curve. Mode 14 makes it possible to erase a curve segment marked in the selection mode. The processing mode 15 allows a marked curve region selected in the selection mode to be shifted, elongated or compressed. The mode 16 allows the support points or values to be introduced or erased.

The wall thickness application is effected via undue memory. An active profile can be stored prior to a change. The button 17a allows stepping backward while button 17b steps forward in memory so that old profiles can be activated anew. The mode 18 allows changes in the profile to be incorporated in the process control and mode 19 allows all of the changes carried out in profile to be canceled to the extent that the curve has not yet been incorporated into the process control.

The cursor buttons 20 enable shifting of the cursor or the curve regions to be displaced in the directions indicated by the arrows. Alternatively it is possible to effect these actions by a stylus operating on the screen for marking a nonmarked support point, the button 21 is actuated. In addition, the system permits quality monitoring and the actual curve to replace the profiles control curve as a master curve, erasure of the entire profile or selected segments and cancellation of the marking of all selected support values.

We claim:

1. A method of producing blow-molded articles comprising the steps of:
   (a) blow molding an elongated hollow article with a wall thickness varying along a length thereof on a blow molding machine having a computer-controlled blow molding nozzle with a nozzle gap width varying during the blow molding of the article in accordance with a stored program and comparison of measured values of said gap width with programmed values thereof;
   (b) displaying an image of an article blow molded in step (a) on a screen of a computer controlling said blow molding machine alongside an outline of a wall thickness control curve generated by said program and represented an intended wall thickness of blow molded articles to be produced; and
   (c) marking critical locations of the wall thickness control curve on the displayed image.

2. The method defined in claim 1 wherein deviations of the actually produced article from an article documented by the computer are determined and the differences used to modify the curve.

3. The method defined in claim 1 wherein different profiles of wall thickness control curves are juxtaposed with the image of the finished article and are stored in memory.

4. The method defined in claim 1 wherein said curve is modified and at least one modified curve is stored in memory.

* * * * *